UNITED STATES PATENT OFFICE.

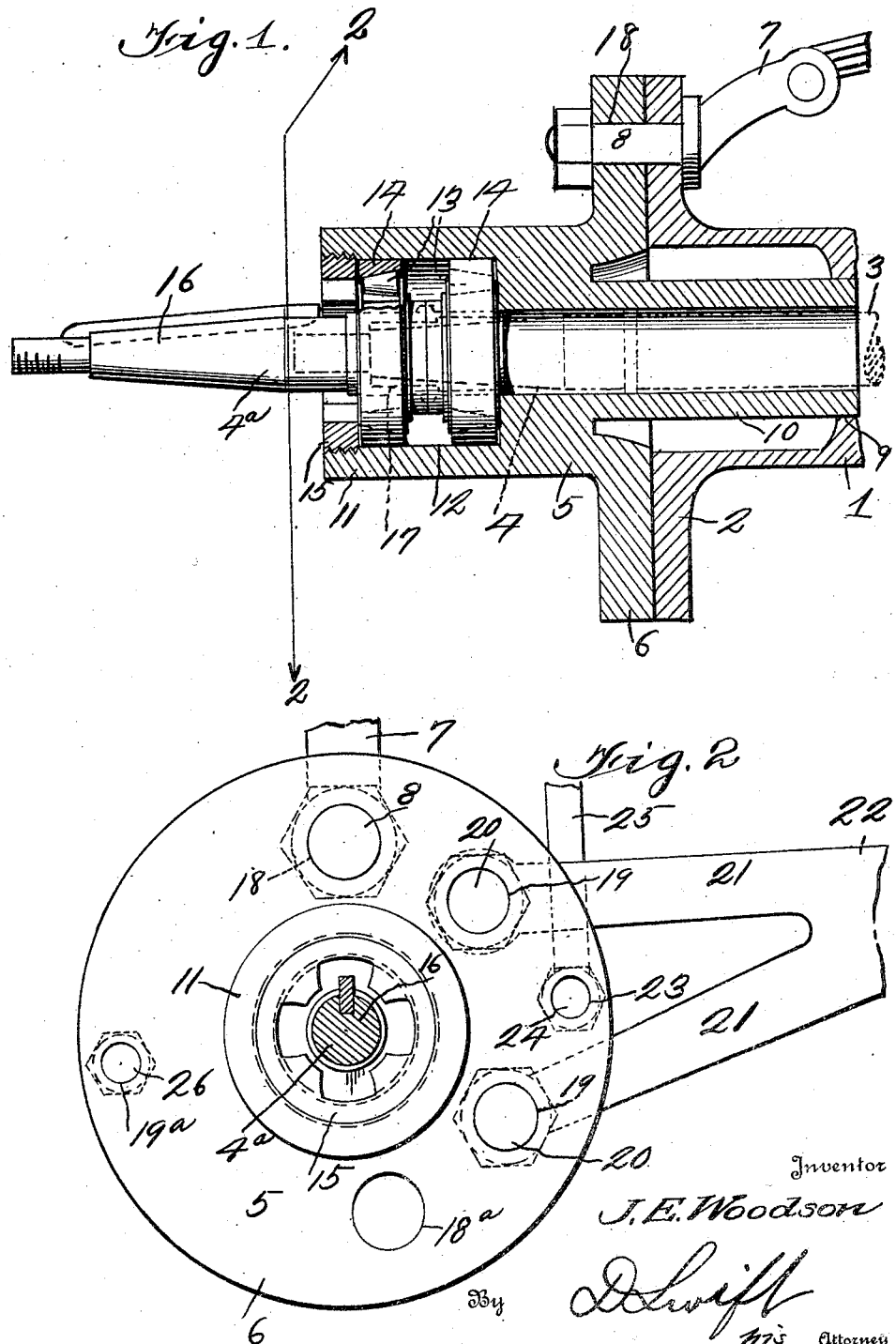

JOHN E. WOODSON, OF COTTAGE GROVE, OREGON.

EMERGENCY STUB AXLE.

1,410,863.  Specification of Letters Patent. Patented Mar. 28, 1922.

Application filed June 30, 1921. Serial No. 481,517.

*To all whom it may concern:*

Be it known that I, JOHN E. WOODSON, a citizen of the United States, residing at Cottage Grove, in the county of Lane, State of Oregon, have invented a new and useful Emergency Stub Axle; and I do hereby declare the following to be a full, clear, and exact description of the invention, such as will enable others skilled in the art to which it appertains to make and use the same.

The invention relates to emergency stub axles for motor driven vehicles, and has for its object to provide a device of this character comprising a flanged member adapted to be secured to the rear axle housing, and having rotatably mounted therein in antifrictional bearings an axle spindle for the reception of a wheel, said axle spindle and flanged member forming means whereby a wheel may be attached to the rear axle in case of emergency, for instance upon breakage of the spindle of the rear axle, breakage of the rear axle, or locked differential.

A further object is to provide the inner end of the spindle carried by the flanged member with a recess, said recess forming means for receiving the outer end of the original axle spindle in cases where the trouble rises from a locked differential.

A further object is to provide means whereby the axle spindle carried by the flanged housing may be easily and quickly mounted in said flanged member.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a vertical longitudinal sectional view through the flanged member showing the spindle therein and showing the flanged member attached to the rear axle housing after the removal of the brake mechanism and wheel.

Figure 2 is a vertical sectional view through the emergency axle spindle taken on line 2—2 of Figure 1.

Referring to the drawings, the numeral 1 designates the rear axle housing of a motor driven vehicle, and 2 the flange thereof, to which flange the usual brake mechanism, radius rods and spring perch are attached. Rotatably mounted within the axle casing 1 is a conventional form of axle 3 which extends outwardly beyond the flange 2. It has been found that when the spindle 4 of the axle 3 become broken, or the differential locked, that means has to be provided for supporting the vehicle so that it can be towed to a garage or repair station. To accomplish this result, after the wheel has been removed, the brake mechanism and various parts carried within the end of the rear axle casing 1 are removed, a flanged member 5 is then placed with its flange 6 in engagement with the flange 2 of the axle casing and is securely bolted thereto by means of bolts for instance in the case of the spring perch 7 the bolt 8 thereof being utilized as one of the securing means for securing the flange 6 to the flange 2.

Extending into the bore 9 of the axle housing 1 is a cylindrically shaped sleeve 10, which sleeve receives the permanent spindle 4 in the case, said spindle is not broken, and the trouble is primarily caused by what is known as a locked differential. The flanged member 5 is provided with an outwardly extending cylindrical portion 11 in the cylindrical chamber of which removable antifrictional bearings 13, which bearings are carried by an auxiliary stub axle 4ª are disposed. The antifrictional bearings 13 are held in place within the chamber 12 by means of bearing cups 14, the inner bearing cup if so desired may be permanently fixed within the chamber 12, however the outer bearing cup 14 is preferably removable and is held in place by an adjusting nut 15, which nut may be adjusted for taking up any looseness in the bearing as a whole. The stub axle revolves within the antifrictional bearings 13 independently of the axle 3, and receives on its spindle 16 the wheel which has been removed or an emergency wheel of the usual type wherein the spindle turns with the wheel.

Where the trouble is caused by what is known as a locked differential, that is the gears in the differential becoming so locked in such a manner that one of the axles 3 will not rotate; in which case after the wheel and brake mechanism have been removed and the flanged member 5 placed in position, the outer end of the axle spindle 4 is received in a recess 17 in the inner end of the stub axle, thereby allowing the use of the stub axle while the axle spindle 4 is still in place and not rotated.

The spring perch bolt 8 is received in an aperture 18 in the flange 6, said flange being also provided with spaced apertures 19 for the reception of the bolts 20, which secure the arms 21 of the radius rod 22 to the axle housing, thereby allowing the bolts 20 to be utilized for securing the flanged member 5 in place. The flange 6 is also provided with an aperture 23 which receives the bolt 24 of the cam lever 25, which operates the brake band thereby allowing said bolt to also be utilized for securing purposes. Flange 6 at a diametrically opposite side of the flange is provided with an aperture 19ª which receives a brake shoe bolt 26. It will be noted that the apertures 18, 19, 23 and 19ª are so positioned that when the flanged member 5 is positioned on the left side of the axle in a reverse position to that shown in Figure 2, that the perch bolt receiving aperture 18ª will be upwardly disposed for receiving the perch bolt on the left side of the machine and that the other apertures will be correspondingly positioned for receiving the various bolts.

From the above it will be seen that an emergency stub axle device is provided for motor driven vehicles, which device is simple in construction and so constructed that the same may be easily and quickly applied to either end of the rear axle housing and utilized for receiving a supporting wheel thereby allowing a damaged vehicle to be towed to a garage or repair shop.

The invention having been set forth what is claimed as new and useful is:—

The combination with the rear axle of a motor driven vehicle, said axle being rotatably mounted in a housing having a flange adjacent its end and through which flange bolts pass, of an emergency stub axle therefor, said stub axle comprising a casing having a flange registering with the housing flange and provided with apertures for the reception of the bolts carried by the housing flange, said apertures being so positioned that the casing may be secured to the flange at either end of the axle housing, and a stub axle rotatably mounted in antifrictional bearings in the casing and forming means for the reception of a supporting wheel.

In testimony whereof I have signed my name to this specification in the presence of two subscribing witnesses.

JOHN E. WOODSON.

Witnesses:
 WORTH HARVEY,
 S. L. CHURCHILL.